ically mixed together. To this resulting mixture
UNITED STATES PATENT OFFICE.

FRANK D. WOLFGRAM AND EDWARD KLAUSMAN, OF MILWAUKEE, WISCONSIN, ASSIGNORS TO SANITARY BRUSH AND COMPOUND COMPANY, OF MILWAUKEE, WISCONSIN, A CORPORATION OF WISCONSIN.

SWEEPING COMPOUND.

939,369.    Specification of Letters Patent.    Patented Nov. 9, 1909.

No Drawing.    Application filed December 30, 1908. Serial No. 470,070.

*To all whom it may concern:*

Be it known that we, FRANK D. WOLFGRAM and EDWARD KLAUSMAN, residing in Milwaukee, in the county of Milwaukee and State of Wisconsin, have invented new and useful Improvements in Sweeping Compounds, of which the following is a description, reference being had to the accompanying drawings, which are a part of this specification.

This invention relates to sweeping compounds and has for its object to provide a compound to be used when sweeping to prevent the raising of dust and is distinguished from other sweeping compounds in that it is free from oil which usually forms a main ingredient as a coating for saw dust to cause the particles of dust to adhere thereto.

In the present invention instead of coating saw dust with oil it is only desired to keep the saw dust in a permanently moist state and this is done mainly by the addition of glycerin thereto.

In preparing the sweeping compound in accordance with this invention we make use of a waste product of another art, the red cedar flour which has been used for drying and burnishing metal articles after they have been tinned. This red cedar flour is used after the tinning process to remove grease or tallow with which the articles are coated incident to the tinning process and as at present employed the by-product consists approximately of red cedar flour, eighty-five per cent.; tallow, ten per cent., and animal fiber, five per cent. The animal fiber is wool, fiber and bristles which are lost in the red cedar flour during the burnishing or polishing process.

The above ingredients will be referred to as mixture A and to it is added a mixture B which consists of the following ingredients in approximately the proportions given: water, ten per cent.; formaldehyde, two per cent.; glycerin, three to five per cent.; isinglass, two to three per cent.; potassium silicate, ten per cent.; paraffin wax, two per cent. These are mixed to a consistency of from twenty to twenty-five degrees Baumé at seventy-five degrees Fahrenheit and mixtures A and B are thoroughly mixed together. To this resulting mixture is added twenty to thirty per cent. of sulfate of soda or magnesium sulfate or borax and after mixing again the compound is ready for use in the usual manner, by sprinkling it on the floor and sweeping it over the surface of the floor along with the dust, the moist condition of the compound causing the dust to adhere thereto and preventing it from being raised in the air.

Obviously substitutions may be made for various ingredients of the compound, as saw dust or other wood fiber may take the place of the red cedar flour and fish glue may be substituted for isinglass and sodium silicate may be substituted for potassium silicate.

Owing to the presence of the glycerin the moist nature of the compound is preserved indefinitely and consequently it does not dry out but remains in its soft moist state, ready for use at all times.

What we claim as our invention and desire to secure by Letters Patent is:—

1. A sweeping compound, comprising a wood fiber or saw dust, water, potassium silicate, paraffin wax and sulfate of soda.

2. A sweeping compound, comprising red cedar flour, tallow, animal fiber, water, formaldehyde, glycerin, isinglass, potassium silicate, paraffin wax, and sulfate of soda.

3. A sweeping compound, comprising the following ingredients or their substantial equivalents in approximately the proportions given; mixture A comprising red cedar flour eighty five per cent., tallow ten per cent. and animal fiber five per cent., mixture B, comprising water ten per cent., formaldehyde two per cent., glycerin three to five per cent., isinglass two to three per cent., paraffin wax two per cent. and potassium silicate ten per cent., and sulfate of soda from twenty to thirty per cent.

4. A sweeping compound, comprising wood fiber or saw dust, tallow, animal fiber, water, potassium silicate, paraffin wax and sulfate of soda.

In testimony whereof, we affix our signatures, in presence of two witnesses.

FRANK D. WOLFGRAM.
EDWARD KLAUSMAN.

Witnesses:
R. S. C. CALDWELL,
ALMA A. KLUG.